United States Patent [19]

Audesse et al.

[11] 4,017,728
[45] Apr. 12, 1977

[54] MULTILAMP PHOTOFLASH UNIT HAVING RADIANT-ENERGY-ACTIVATED QUICK-DISCONNECT SWITCH

[75] Inventors: Emery G. Audesse; William T. Colville; John W. Shaffer; David W. Mecone, all of Williamsport, Pa.

[73] Assignee: GTE Sylvania Incorporated, Montoursville, Pa.

[22] Filed: Sept. 17, 1975

[21] Appl. No.: 614,108

[52] U.S. Cl. .............................. 240/1.3; 431/95 R
[51] Int. Cl.$^2$ ..................... G03B 15/02; F21K 5/02
[58] Field of Search ............ 240/1.3; 431/92, 95 R, 431/95 A

[56] References Cited

UNITED STATES PATENTS

| 3,532,931 | 10/1970 | Cote et al. | 431/95 R |
| 3,666,394 | 5/1972 | Bok et al. | 431/95 R |
| 3,728,067 | 4/1973 | DeGraaf et al. | 431/95 R |
| 3,894,226 | 7/1975 | Hanson | 240/1.3 |
| 3,935,442 | 1/1976 | Hanson | 240/1.3 |

Primary Examiner—George H. Miller, Jr.
Attorney, Agent, or Firm—Edward J. Coleman

[57] ABSTRACT

A photoflash lamp array comprising a plurality of high voltage type flashlamps mounted on a printed circuit board containing circuitry for sequentially igniting the flashlamps in response to successive high voltage firing pulses applied thereto. A plurality of reflectors respectively associated with the flashlamps are disposed between the lamps and circuit board, with each reflector having an aperture in alignment with a corresponding aperture in the circuit board. Connected in series with each but the last lamp of the array is a radiant-energy-activated quick-disconnect switch comprising a strip of electrically conductive heat shrinkable, polymeric material which is attached at both ends to the circuit board so as to bridge a respective one of the apertures therein. Upon ignition of its associated flashlamp, each disconnect switch is operative in response to the resulting radiation through the aperture aligned therewith to rapidly provide a reliable open circuit to high voltages, thereby permitting reliable flashing of the lamps in rapid succession.

24 Claims, 11 Drawing Figures

FIG. 1 FIG. 2 FIG. 3
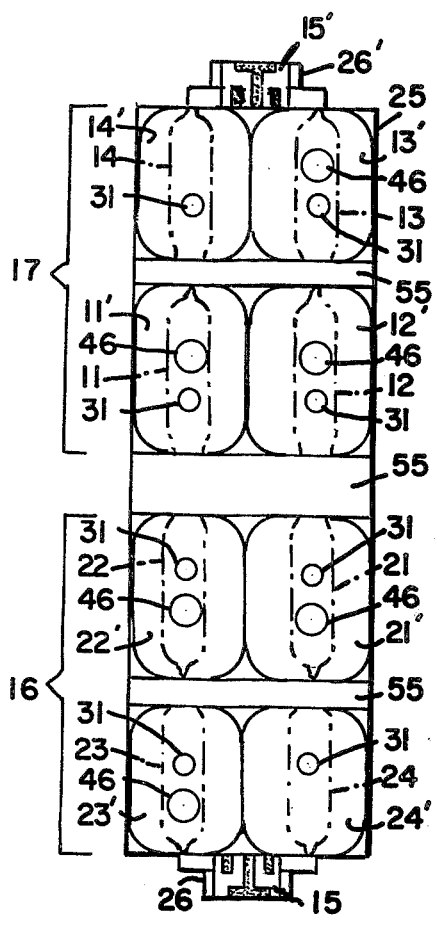
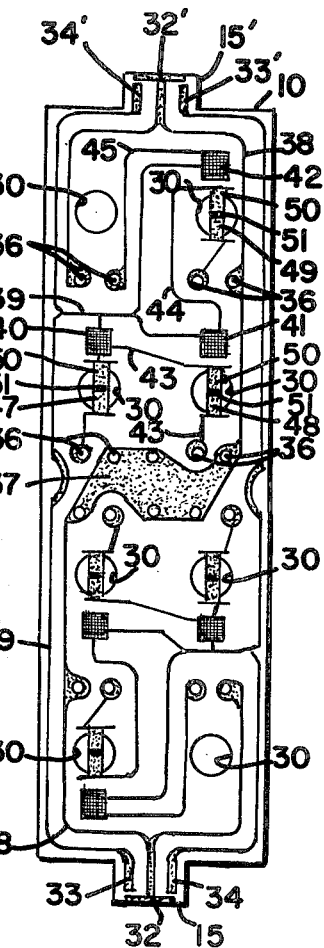
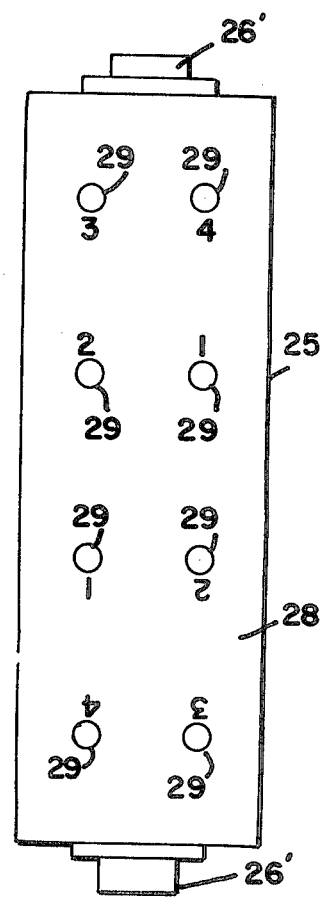
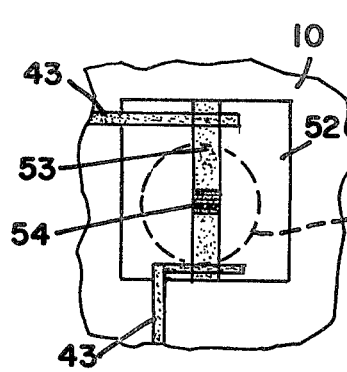
FIG. 9  FIG. 10
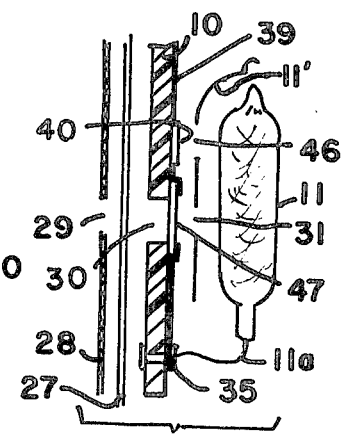
FIG. 4

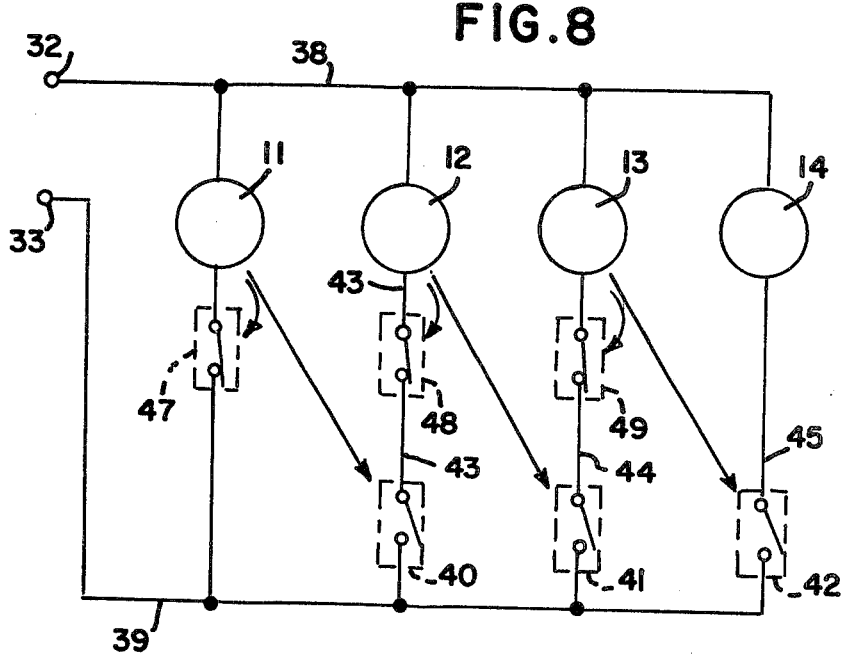
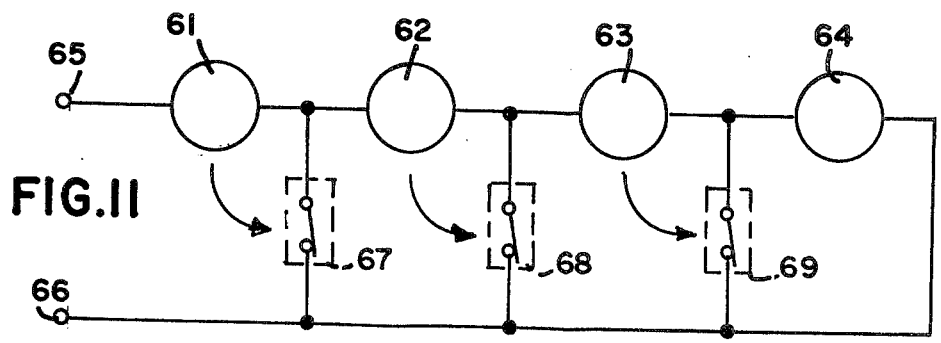
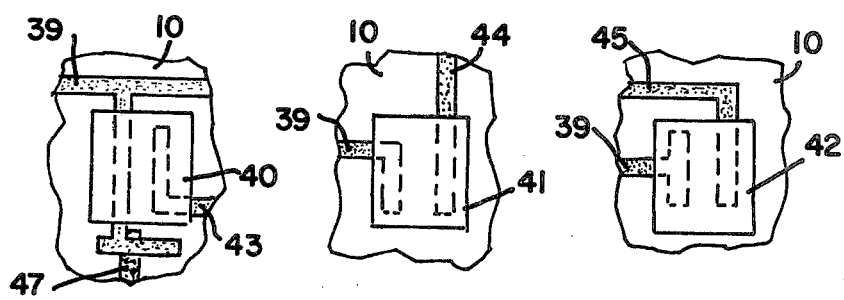

MULTILAMP PHOTOFLASH UNIT HAVING RADIANT-ENERGY-ACTIVATED QUICK-DISCONNECT SWITCH

BACKGROUND OF THE INVENTION

This invention relates to multilamp photoflash devices having circuit means for sequentially igniting the flashlamps and, more particularly, to improved switching means for permitting reliable flashing of an array of photoflash lamps in rapid succession.

Numerous multilamp photoflash arrangements with various type of sequencing circuits have been described in the prior art, particularly, in the past few years. Series and parallel-connected lamp arrays have been shown which are sequentially fired by mechanical switching means, simple electrical circuits, switching circuits using the randomly varied resistance characteristics of the lamps, arc gap arrangements, complex digital electronic switching circuits, light-sensitive switching means and heat-sensitive switching devices which involve melting, fusing or chemical reaction in response to the radiant energy output of a proximate flashed lamp. The present invention is concerned with an improved radiant-energy-activated switching means useful in a relatively inexpensive photoflash unit of the disposable type. In particular, the present switching means is particularly advantageous in photoflash arrays employing high voltage type lamps adapted to be ignited sequentially by successively applied high voltage firing pulses from a source such as a camera-shutter-actuated piezoelectric element.

A currently marketed photoflash unit of the last-mentioned type described in U.S. Pat. No. 3,894,226 and referred to as a flip flash. The unit comprises a planar array of eight high voltage type flashlamps mounted on a printed circuit board with an array of respectively associated reflectors disposed therebetween. The lamps are arranged in two groups of four disposed on the upper and lower halves, respectively, of the rectangular shaped circuit board. A set of terminal contacts at the lower end of the unit is provided for activation of the upper group of lamps, while a set of terminal contacts at the top of the unit is operatively associated with the lower group of four lamps. The application of successive high voltage pulses (e.g., 500 to 4000 volts from, say, a piezoelectric source controlled by the shutter of a camera in which the array is inserted) to the terminal contacts at the lower end of the unit causes the four lamps at the upper half of the array to be sequentially-ignited. The array may then be turned end for end and again inserted into the camera in order to flash the remaining four lamps.

The flip flash circuit board comprises an insulating sheet of plastic having a pattern of conductive circuit traces, including the terminal contacts, on one side. The flashlamp leads are electrically connected to these circuit traces by means of eyelets secured to the circuit board and crimped to the lead wires. The circuitry on the board includes six printed, normally open, connect switches, that chemically change from a high to low resistance, so as to become electrically conducting, after exposure to the radiant heat energy from an ignited flashlamp operatively associated therewith. A thermal connect switch of this general type is described in U.S. Pat. No. 3,458,270 of Ganser et al. The purpose of these switches is to promote lamp sequencing and one-at-a-time flashing. The four lamps of each group are arranged in parallel, with three of the four lamps being connected in series with a respective thermal connect switch. Initially, only the first of the group of four lamps is connected directly to the voltage pulse source. When the first lamp flashes, it causes its associated thermal connect switch (which is series connected with the next, or second, lamp) to become permanently conductive. Because of this action, the second lamp of the group of four is connected to the pulse source. This sequence of events is repeated until all four lamps have been flashed. A major problem of this prior art circuit and other similar arrangements is that if one lamp short circuits internally upon flashing, the successive parallel lamps of that group of four cannot be flashed; i.e., the remaining lamps are shorted out.

It has been found that this problem can be eliminated by the use of a radiant-energy-activated switch that is normally conducting and which becomes nonconducting subsequent to exposure to the actinic output of the flashlamp associated therewith. This disconnect switch is used in series with each of the lamps, except the last lamp, in a sequentially flashing parallel group of high voltage flashlamps. It may be used, if desired, in addition to the printed connect switches, which are normally open and which close upon actinic exposure. Hence, the modes of action of these two types of switches are opposite from one another — the disconnect switch interrupts the igniting circuit of the lamp in series with it upon firing of that lamp, while the thermal connect switch establishes the igniting circuit for the next lamp upon being activated.

A number of radiant-energy-activated disconnect switches have been described in the prior art. U.S. Pat. No. 3,532,931 of Coté et al. illustrates the use of current-sensitive fuses in series with individual lamps and suggests the alternative of using heat-sensitive or light-sensitive circuit interrupters; specific examples of the alternative interrupters are not given however. U.S. Pat. No. 3,692,995 of Wagner describes a series photoflash arrangement employing lampbulbs which have a high internal resistance before flashing and a low internal resistance after flashing. Fuses connected in series with each lamp function to short out the unselected lamps. Upon ignition of a selected lamp, the heat developed by the flash melts its respective fuse to remove the short across the next lamp in sequence. The fuse material is not discussed.

U.S. Pat. No. 3,762,631 of De Graaf et al. shows both series and parallel flashlamp arrangements with sequencing controlled by the use of disconnect switches comprising fusible strips which melt in response to the heat of flashing. The fusible material is not otherwise elaborated upon. The switches provide both lamp-removal and short-removal functions. U.S. Pat. No. 3,728,067 of DeGraaf et al includes a circuit similar to the series arrangement of U.S. Pat. No. 3,726,631 except it also includes a heat sensitive connect switch in lieu of a resistor.

U.S. Pat. No. 3,666,394 of Bok et al discloses a variety of ignition sequencing circuits for a plurality of flashlamps of either the high or low voltage type connected in parallel. Each circuit includes a plurality of radiant-heat-activated disconnect switches in series with respective lamps for countering the aforementioned problem of being unable to flash subsequent lamps of the array in the event a given lamp has an internal short after ignition. One of the circuits employs heat-sensitive connect switches along with the disconnect switches. The disconnect switch elements are described as comprising a locally blackened wire or strip of an alloy or metal which melts at temperatures between 85° and 400° C. Metals suggested as suitable for this purpose are bismuth, cadmium, indium, lead, tin and alloys thereof which melt at the above temperatures and/or alloys of those metals and the metals silver, copper, zinc, aluminum, silicon magnesium, antimony, nickel, thallium and gold. The preferred material is given as a known solder alloy of tin and lead (60:40) having a melting point of 180° C and provided in a strip having a section of from 1 to 2 mm. by 0.014 mm. This strip is preferably located at a distance of from 5 mm. to 20 mm. from the wall of the respective flashlamp envelope; although Bok et al also mentions that the disconnect switching element may be provided on the outer wall of the lamp envelope or on or in the associated reflector or in the vicinity of the base of the flashlamp, such as on or in its holder.

Another problem associated with high voltage type flashlamps, however, is that of temporary post-flash electrical conductivity which occurs until the lamp has cooled back down to some temperature at which such conductivity ceases. It is well known that even glass becomes significantly conductive at sufficiently elevated temperatures. The next lamp in sequence will not flash until this thermally promoted electrical conductivity of the preceding lamp has subsided. This may take from one to several seconds, depending on the lamp construction and materials used. An attempt to take repeated pictures at too rapid a rate may therefore cause array failures and wasted film. Hence, for applications requiring high flash sequencing rates, a corollary problem arises in that not only is a reliable disconnect of the ignited lamp required, but this reliable open circuit to high voltages must be provided very quickly in response to the radiant energy output of the lamp.

The above discussed prior art patents relating to disconnect switches do not discuss the speed of switching. For camera applications requiring a capability whereby the lamps can be flashed one or two seconds apart, the described switching mechanism of melting away a fusible metal strip would not appear to provide a sufficiently rapid and failsafe open circuit to high voltages. If the cross-section of the fusible strip is reduced in an attempt to increase the speed of melting back, a question of the strength and ruggedness of the structure, and thus the reliability of switching, arises. Splatter of molten metallic particles could provide a spark path for the high voltages used herein. Further considerations are cost and the ease of application of the fusible strip using the automated production techniques customarily employed in the manufacture of photoflash units.

SUMMARY OF THE INVENTION

Accordingly, it is an object of the present invention to provide a photoflash unit having improved switching means for permitting reliable flashing of an array of photoflash lamps in rapid succession.

A principle object of the invention is to provide a radiant-energy-activated quick-disconnect switch for a photoflash unit which is operative in response to the radiation from an ignited flashlamp to rapidly provide a reliable open circuit to high voltages.

Still another object of the invention is to provide a multilamp photoflash array having a plurality of inexpensive radiant-energy-activated, quick-disconnect switches which are relatively strong and durable and readily adapted to automatic machine assembly techniques.

These and other objects, advantages and features are attained, in accordance with the invention, by employing in series with each lamp of the photoflash unit a switch element comprising a piece of electrically conductive, heat shrinkable, polymeric material which is positioned so as to be in operative relationship with the radiant output from the series connected lamp during the ignition thereof. Each switch element is attached at both ends to the lamp igniting circuit with the midportion of the element being spatially suspended to avoid contact with heat absorbing surfaces. Upon ignition of its associated lamp, the midportion of the switch element rapidly shrinks and separates in response to the radiant output of the lamp, thereby providing a quick-acting, reliable open circuit to high voltages.

By way of example, the disconnect switches are preferably fabricated from mono- or biaxially oriented film, ribbon, or filament, such as polyester, polystyrene, or polypropylene. The polymeric film itself may be rendered electrically conductive by additives, such as conductive carbons, or may be rendered surface conductive by deposition of conductive layers thereon. Such conductive surface layers may be attained, e.g., by vacuum metallization, electroless, plating, printing, or coating using conductive inks, or by silk screening or otherwise applying a conductive path across the length of polymeric material defining the switch. The performance of highly reflective materials, such as aluminized polypropylene, can be enhanced by applying a coating or spot of dark, heat-absorbing ink or other similar material onto the surface facing the flashlamp. The piece of material may be self-adhesive, such as a tape, and pressure-applied to the desired support member or circuit board location.

According to one embodiment, disconnect switches according to the invention are employed in a photoflash array including a plurality of flashlamps mounted on a printed circuit board. The circuit board is provided with a plurality of apertures respectively in alignment with the flashlamps mounted thereon, and each length of conductive heat shrinkable material comprising a switch is attached to the circuit board so as to bridge a respective aperture therein. In this manner, the midportion of the material is spatially suspended to avoid contact with the circuit board. For silk screened circuitry it is advantageous to carry the conductive circuit pattern over the ends of the preapplied switch material, whereby the circuit material helps to anchor the switch ends to the circuit board substrate.

A switch of this type is quite inexpensive and relatively easy to apply using high speed, automated production machinery, particularly in the case of self-adhesive strips that may be pressure-applied. The spatially suspended heat shrinkable material is operative in response to radiant heat energy from a flashlamp to very rapidly provide a clean, wide open circuit interruption, since it relies not merely on a change of phase (melting) of the switch material, but it also involves a rapid change in dimension (heat shrinking). For example, disconnect switches of this type can operate within 30 milliseconds or less, thereby permitting high flash sequencing rates. Further, oriented polymeric film inherently provides a high degree of mechanical integrity; hence, a suspended film, strip or filament of the material will reliably remain intact, without cracking or breaking, when subjected to the handling and vibration that photoflash units can be expected to encounter.

In further embodiments, the disconnect switch may be combined in circuit with a radiant-energy-activated connect switch operative to sequence to the next lamp; the heat shrinkable switch may be aligned with a heat-sensitive flash indicator; or the heat shrinkable polymeric material may be applied as a patch over an aperture in a circuit board, with an indicator color on one side of the material and a conductive ink trace, or the like, across the other side, whereby radiant-heat-activated shrinking back of the midportion of the patch provides the dual functions or circuit interruption and flash indication.

BRIEF DESCRIPTION OF THE DRAWINGS

This invention will be more fully described hereinafter in conjunction with the accompanying drawings, in which:

FIG. 1 is a front elevation of a multilamp photoflash array, with the lamps thereof shown in phantom;

FIG. 2 is a front elevation of a printed circuit board used in the array of FIG. 1, the circuit board including quick-disconnect switches in accordance with the invention;

FIG. 3 is a rear elevation of the array of FIG. 1;

FIG. 4 is a sectional schematic showing the alignment of an individual lamp of the array of FIG. 1 with respect to its reflector, circuit board switches, and flash indicator;

FIGS. 5, 6, and 7 are enlarged fragmentary detail views of portions of the circuit board of FIG. 2 respectively illustrating the physical circuit arrangements of the three connect switches on the top half thereof;

FIG. 8 is a circuit diagram for the top half of the photoflash array of FIGS. 1-3;

FIG. 9 is an enlarged fragmentary detail view of a portion of the circuit board of FIG. 2 illustrating the physical circuit arrangement of one of the disconnect switches thereof;

FIG. 10 is an enlarged fragmentary detail view of a portion of the circuit board illustrating the physical arrangement of an alternative disconnect switch embodiment; and FIG. 11 is a circuit diagram of an alternative multi-lamp flash sequencing arrangement employing disconnect switches according to the invention.

DESCRIPTION OF PREFERRED EMBODIMENT

FIGS. 1-3 illustrate portions of a multilamp photoflash unit similar to that described in the aforementioned U.S. Pat. No. 3,894,226, except that the ignition sequencing circuit thereof has been modified to include disconnect switches in accordance with the invention. The unit includes a planar array of eight high voltage type flashlamps 11-14 and 21-24 mounted on a printed circuit board 10, with an array of respectively associated reflectors 11'-14' and 21'-24' disposed therebetween. The array is provided with a plug-in connector tab 15 at the lower end thereof which is adapted to fit into a camera or flash adapter. A second plug-in connector tab 15' is provided at the top end of the unit, whereby the array is adapted to be attached to the camera socket in either of two orientations, i.e. with either the tab 15 or the tab 15' plugged into the socket. The lamps are arranged in two groups of four disposed on the upper and lower halves respectively of the rectangular shaped array. Upper group 17 comprises lamps 11-14, and lower group 16 includes lamps 21-24; the reflectors 11', etc. are disposed behind the respective lamps so that as each lamp is flashed light is projected forwardly of the array. The lamps are arranged and connected so that when the array is connected to a camera by the connector tab 15 only the upper group 17 of lamps will be flashed, and then the array is turned end for end and connected to the camera by the other connector tab 15', only the then upper group 16 of lamps will be flashed.

The above mentioned components are packaged in a rectangular box-like plastic container 25, which may comprise two pieces of plastic that are secured together. The entire container may be molded from a generally clear plastic material, or at least the window portions in the front of the flash lamps are rendered light transmitting. The window portions may also be tinted for color correction purposes. The plastic container 25 includes integral extensions 26 and 26' at the ends thereof which partly surround and protect the connector tabs 15 and 15' and also function to facilitate mechanical attachment to the camera socket. Sandwiched between the front and back walls of the container 25, in the order named and as generally illustrated by the schematic drawing of FIG. 4, are the flash lamps 11, etc., a reflector member (preferably of aluminum-coated plastic) shaped to provide the individual reflectors 11', etc., the printed circuit board 10 provided with the integral connector tabs 15 and 15', and a flash indicator assembly comprising a sheet of heat shrinkable material 27 and an indicia sheet 28, which may be provided with instructions, information, trademarks, and other indicia such as flash indicators 29 located behind the respective lamps and which change color due to heat radiation from a flashing lamp, thus indicating at a glance which of the lamps have been flashed and not flashed. If the back surfaces of the reflectors are electrically conductive, an electrically insulating sheet (not shown) may be inserted between the reflectors and conductive traces on the circuit board, as described in the aforementioned U.S. Pat. No. 3,894,226.

The indicia sheet 28 may be of paper or thin cardboard and provided with openings where the flash indicators 29 are desired. The flash indicator material 27 may comprise a sheet of heat-sensitive plastic material, for example, biaxially oriented polypropylene, which shrinks or melts when subjected to heat or radiant energy from an adjacent flashing lamp, thus effectively changing the color of the openings in the indicia sheet 28. For example, the plastic material can be colored blue on its backside by ink or other suitable means, and the blue disappears and the opening becomes a different color (dark, for example) when the plastic shrinks or melts away due to heat from an adjacent flashing lamp. The front of the plastic (toward the lamps) should be coated with dark ink so as to absorb heat more readily. A single flash indicator sheet 27 may be arranged over all of the flash indicator openings. Openings, or apertures, 31 are provided through each reflector unit, and correspondingly aligned openings or apertures 30 are provided in the circuit board 10, to facilitate radiation from the flash lamps reaching the flash indicators 29. The rear panel of the container 25 is transparent (either of clear material or provided with window openings) to permit viewing of the indicia on the indicia sheet 28.

The tab 15 which is integral with the circuit board 10 is provided with a pair of electrical terminals 32 and 33, and similarly the tap 15' is provided with a pair of terminals 32' and 33', for contacting terminals of a camera socket for applying firing voltage pulses to the array. Each tap is provided with a third terminal 34 and 34', respectively, which functions to electrically short the circuitry of the inactive lower group of lamps, when the array is plugged into a socket. The terminals 32 and 32' are shown as having a lateral T-shaped configuration for temporarily shorting the socket terminals while the array is being plugged in to discharge any residual voltage charge which may remain in the firing pulse source and also to reduce the likelihood of lamps being accidentally flashed by electrostatic voltage when the array is handled.

The circuit board 10 has a "printed circuit" thereon, as will be described, for causing sequential flashing of the lamps by firing voltage pulses applied to terminals 32, 33 or 32', 33'. The top and bottom halves of the printed circuitry preferably and reverse mirror images of each other. The lead wires 11a, 11b, etc., of the lamps 11, etc., (only lead wire 11a is shown in FIG. 4) may be attached to the circuit board 10 in various ways, such as by means of metal eyelets 35 (FIG. 4) placed through openings 36 (FIG. 2) in the board. The lead wires pass through openings (not shown) in the reflector member and into or through the respective pairs of eyelets, and the ends of the eyelets are crimped or bent to hold the lead wires and make electrical contact thereto and also to hold the eyelets in place with their heads in electrical contact with the circuit of the circuit board. A metal clip (not shown) is clipped onto the reflector member, which reflector is preferably made of metal-coated plastic, and the rear of the clip rests in electrical contact with an area 37 (FIG. 2) of an electrical ground circuit run 38 on the board which includes the terminals 32 and 32' and which makes contact with one of the connector eyelets for each of the lamps, whereby the reflector unit additionally functions as an electrically grounded shield.

Areas 55 on the transparent front wall of the container 25 may be made opaque or partly opaque, such as by making the surface roughened at these areas, to fully or partly conceal the lamp lead-in wires and/or the lower portions of the lamps, for improved appearance of the array.

In the case of the prior art circuit board described in the aforementioned U.S. Pat. No. 3,894,226, terminal 33 is part of a conductor run 39 that is electrically connected by means of an eyelet 35 to one of the lead-in wires of lamp 11 and terminates at the radiant-energy-activated connect switches 40, 41 and 42 respectively positioned near lamps 11, 12 and 13. A circuit board conductor run 43 is connected electrically to a lead wire of flash lamp 12 via an associated eyelet and terminates at the connect switch 40. A circuit board conductor run 44 is connected to a lead wire of flash lamp 13 via an eyelet and terminates at the connect switch 41. Similarly, a circuit board connector run 45 is connected to a lead wire of flash lamp 14 via an eyelet and terminates at connect switch 42. As best illustrated in FIGS. 5, 6, and 7 respectively, the radiant energy activated connect switches 40, 41 and 42 respectively are in contact with and bridge across the circuit runs that are connected to them. The material for the connect switches is selected to be a type initially having an open circuit or high resistance, the resistance thereof becoming nearly zero or a lower value when the material receives radiation in the form of heat and/or light from a respective adjacent lamp, upon the lamp being flashed. For this prupose, each of the connect switches is respectively positioned behind and near to a flashlamp 11, 12, and 13. To facilitate radiation transfer from a flashed lamp to is corresponding connect switch, each of the reflectors 11', 12' and 13' include a second opening, or aperture, 46 in alignment respectively with the heat activated connect switches 40, 41 and 42. The heat sensitive connect switches may be similar to the type described in the aforementioned Ganser et al U.S. Pat. No. 3,458,270 comprising silver oxide dispersed in a binder such a polyvinyl resin. Each of these connect switches upon receiving heat and/or light radiation from the adjacent lamp when it is flashed, changes from an open circuit or high resistance to a closed circuit or low resistance between its switch terminals on the circuit board.

In accordance with the present invention, the lamp ignition circuitry further includes radiant-energy-activated quick-disconnect switches 47, 48 and 49 each electrically connected in series with a respective one of the flashlamps 11, 12 and 13. More specifically, referring to FIG. 2 and the correspondingly numbered circuit diagram of FIG. 8, the normally closed disconnect switch 47 is series connected in the circuit run 39 to lamp 11; disconnect switch 48 is series connected in the conductor run 43 between lamp 12 and the normally opened connect switch 40; and disconnect switch 49 is series connected in conductor run 44 between lamp 13 and connect switch 41. FIG. 5 more clearly illustrates the printed circuit pattern with respect to conductor run 39 and its physical relationship to switches 40 and 47. It will be noted that the run 39 actually passes straight through and beneath the patch of heat sensitive material employed in connect switch 40 in providing electrical path continuity to the element comprising disconnect switch 47. The connect switch 40 is then formed by the gap between the patch covered segment of conductor run 39 and the L-shaped terminus of conductor run 43. The physical arrangements of the connect switches 41 and 42 are shown in FIGS. 6 and 7, respectively, and are relatively straight forward.

In accordance with a further aspect of the invention, each of the quick-disconnect switches 47–49 comprises a length of electrically conductive, heat shrinkable, polymeric material which is attached to the circuit board at both ends, with its mid portion spatially suspended to avoid contact with the heat absorbing surfaces of the circuit board. This arrangement maximizes the speed with which the shrinking and separation of the mid portion of the switch element occurs upon its being heated by the radiant output of an ignited flashlamp. More specifically, referring to the embodiment illustrated in FIGS. 2, 4 and particularly the enlarged view of single switch 48 in FIG. 9, the disconnect switch comprises a thin strip 50 of plastic preferably fabricated from mono- or biaxially oriented polyethylene, polypropylene, polystyrene, polyester or nylon. The polymeric material itself may be rendered electrically conductive by additives such as carbons, or as illustrated, it may be rendered surface conductive by deposition of conductive layers thereon. Such conductive surface layers may be attained, e.g., by a vacuum metallization, electroless plating, printing, or coating using conductive inks, or by silk screening or by otherwise applying a conductive path across the switch defined by the polymeric film. The performance of highly reflective materials, such as aluminized polypropylene, can be enhanced by applying a coating or spot 51 of dark, light absorbing ink or other similar material onto the surface facing the flashlamp. The piece of switch material may be self-adhesive, such as a tape, and pressure applied to attach both ends of the strip 50 to the circuit board as illustrated. Each attached strip is located so that it bridges a respective one of the circuit board apertures 30 so as to provide a desired spatial suspension of the mid portion of the strip. For silk screened circuitry, it is advantageous to carry the circuit pattern over the ends of the preapplied switch strip, as particularly illustrated by the portions of conductive traces 43 carried over the attached ends of the strip 50 in FIG. 9. In this manner the circuit material helps to anchor the switch ends to the circuit board substrate, in addition to providing electrical connection of both ends of the switch strip into the printed circuit.

By locating the disconnect switch strips 50 across the apertures 30, each element of heat shrinkable material is positioned so as to be in operative relationship with the radiant output of its respective lamp via the reflector aperture 31. Hence, upon ignition of a given flashlamp, the switch material is radiantly heated so that it weakens and softens as well as shrinks. A separation occurs near the center of each piece, and the two severed ends shrink back away from each other so as to give an open circuit that will reliably withstand several thousand volts without leakage. Since a lamp after flashing is removed electrically from the circuit, the subsequent lamps are unaffected by short circuiting or residual conductivity in previously flashed lamps. The disconnect switches operate within about 30 milliseconds or less, therefore high flash sequencing rates are permitted. For example, the lamps in multilamp arrays using such disconnect switches sequence properly with the high voltage pulses timed one-half second apart. This is faster than one can manually advance the film to actuate the shutter mechanism in most cameras, let alone framing a picture subject.

It will be also noted that the radiant-energy-activated flash indicators 29 are disposed on the opposite side of the circuit board from the lamps and reflectors in alignment respectively with the circuit board apertures 30 and reflector apertures 31. It will be recalled that the flash indicators are provided by a sheet of shrinkable polymeric material 27 and an overlying indicia sheet 28 having a plurality of openings providing the flash indicators 29. Accordingly, ignition of one of the flashlamps 11, 12 or 13 is operative via the resulting radiation through its respective reflector and circuit board apertures 31 and 30 to activate both the disconnect switch and flash indicator aligned therewith.

As has been explained, the lower portion of the circuit board contains a substantially reverse mirror image of the same circuit shown in the upper part of the circuit board, and therefore will not be described in detail. It will be noted that the circuit runs from the plugged in terminals 32 and 33 at the lower part of the circuit board extend upwardly so as to activate the circuitry in the upper half of the circuit board. Similarly, when the unit is turned around and tab 15' is plugged into a socket, the circuit board terminals 32' and 33' will be connected to and activate the lamps which then will be in the upper half of the circuit board, and hence in the upper half of the flash unit. This accomplishes the desirable characteristic whereby only the group of lamps relatively farthest away from the lens axis will be flashed thereby reducing the possibility of the phenomena known as "red eye".

The circuit on the circuit board 10 functions as follows. Assuming that none of the four lamps in the upper half of the unit have been flashed, upon occurrence of a first firing pulse applied across the terminals 32, 33, this pulse will be directly applied to the lead-in wires of the first connected flash lamp 11, whereupon the lamp 11 flashes and becomes an open circuit between its lead-in wires. Heat and/or light radiation from the flashing first lamp 11 is operative via its respective reflector and circuit board apertures to activate the disconnect switch 47 and the flash indicator aligned with aperture 31 of its reflector and the connect switch 40 aligned with the second aperture 46 of its reflector. As a result, the normally closed disconnect switch 47 is operative in response to the radiation from the lamp to rapidly provide a reliable open circuit to high voltages and thus electrically remove lamp 11 from the circuit, whereby the subsequent lamps 12, 13 and 14 are unaffected by short circuiting or residual conductivity in lamp 11. The radiation causes the normally open connect switch 40 to become a closed circuit (or a low value of resistance), thereby connecting the circuit board terminal 33 electrically to the lead-in wire of the second lamp 12 via the normally closed disconnect switch 48. By the time this occurs, the firing pulse has diminished to a value insufficient to cause the second lamp 12 to flash. When the next firing pulse occurs it is applied to the lead-in wires of the second lamp 12 via the now closed connect switch 40 and disconnect switch 48, whereupon the second lamp 12 flashes, thereby causing disconnect switch 48 to rapidly provide an open circuit and causing connect switch 41 to assume near zero or low resistance. When the next firing pulse occurs, it is applied via now closed connect switch 41 and disconnect switch 49 to the third lamp 13, thereby firing that lamp, whereupon the radiation from lamp 13 activates disconnect switch 49 to rapidly provide an open circuit and causes connect switch 42 to become essentially a closed circuit across its terminals. Thus, the next firing pulse will be applied, via now closed connect switch 42, to the lead-in wires of the fourth flash lamp 14, thereupon causing the lamp to flash. Since this lamp is the last lamp in the active circuit, it does not matter whether its lead-in wires are an open or closed circuit after flashing. Additional flash lamps, radiant-energy-activated switches, and electrical conductors can be employed if desired, using the just applied principle. When the flash unit is turned around and the other connector tab 15' attached to the camera or socket, the group of lamps that then become uppermost and relatively farthest away from the lens axis will be an active circuit and will be flashed in the same manner as has been described. In a preferred embodiment, the lamps 11 etc., are high voltage types requiring between about 500 and 4000 volts, for example, at low current for flashing, and they can be fired by impacting or stressing a piezoelectric element in the camera.

By way of specific example only, a group of thirty such high voltage flash arrays were prepared using circuit boards similar to that in FIG. 2. The disconnect switches comprised 0.0015 inch thick biaxially oriented polystyrene film 0.060 inch wide and 0.375 inch long. The under sides of the film ends were coated with a layer of pressure sensitive adhesive. The upper surface of the film was vacuum metallized with a layer of aluminum so as to afford electrical conductivity. A 1/16 inch stripe of black ink 51 was applied across the center of each switch on the upper surface so as to assist the radiant energy absorption by the switch and thereby help promote film rupture in that area. The conductive circuit pattern was applied up over the ends of the self adhesive switches. Lamps were mounted on the circuit boards and the arrays completed. The arrays were subject to lamp firing pulses timed at one-half and one second intervals. No failures of the disconnect switches were observed.

In like manner, a second group of thirty arrays was prepared using switches that were similar except that the polymeric film was biaxially oriented polypropylene 0.0015 inch thick. Again the completed arrays were subjected to firing pulses at repetition rates of one-half and one second. The disconnect switches functioned as intended. In summary, the use of such quick-acting disconnect switches enhances overall array flash reliability by permitting subsequent lamps to function normally even though a previous lamp has short circuited during flashing. Also the use of the disconnect switches as taught herein permits the reliable flashing of lamps in rapid succession and thereby prevents film waste due to temporary, time-related, post flash lamp conductivity.

As discussed hereinbefore, the disconnect switches are preferably fabricated from a mono- or biaxially oriented polymeric film, ribbon, or filament. Biaxially oriented polypropylene, nylon, or polyester film is a preferred switch substrate because of its mechanical toughness and resistance to attack by the solvents used in silver compositions employed in silk screening of the circuit pattern. A heat shrinkable material is particularly desired because the attendant dimensional changes when subjected to radiant heat contribute to the desired fast-acting switching characteristics. Some polymeric films which are not heat shrinkable may be usable to provide switch opening characteristics approaching that of the heat shrinkable film, but the mono- and biaxially oriented materials (which are thus heat shrinkable) possess a higher degree of mechanical integrity and thus assure the maintenance of reliable disconnect switches without mechanical loosening or breaking apart when the unit is subject to handling and vibration.

Although application of such polymeric disconnect switches to the circuit board of the multilamp flash array is most convenient, it is possible to locate the switch on the lamp reflector, lamp surface, or on the outer container of the flash device. Other components might be added to the flash array for the specific purpose of supportng such disconnect switches.

An alternative dual-functioning disconnect switch configuration is illustrated in FIG. 10. In this instance, the polymeric material is provided in the form of a patch 52 covering a respective aperture 30 in the printed circuit board. The patch has an indicator color on its side facing the circuit board aperture, and the electrically conducting strip comprising the closed switch circuit between printed circuit traces 43 on opposite sides of the aperture is provided by a deposit of conductive material, such as ink, on the surface of the polymeric patch in the form of a strip 53 bridging the aperture 30. If the strip 53 is reflective, it may also be desired to blacken the central portion 54. The conductive strip portion 53 of the polymeric material thereby provides the desired spatial suspension from the printed circuit board at the mid portion of the patch. Upon ignition of an associated flashlamp, the resulting shrinking and separation of the dual function of a disconnect switch and flash indicator. Thus according to this embodiment, the heat shrinkable sheet 27 may be removed from the assembly illustrated in FIG. 4, as the color change mechanism responsive to flashing is visible via the aligned circuit board and indicia sheet openings 30 and 29, respectively.

Of course application of the above described quick-acting disconnect switch is not limited to the circuit of FIG. 8. For example, FIG. 11 illustrates a flashlamp circuit schematic similar to that shown in FIG. 3 of U.S. Pat. No. 3,532,931. The circuit comprises a plurality of flashlamps 61, 62, 63 and 64 series connected across a pulsed voltage source represented by terminals 65 and 66. In this instance, each of the flashlamps 61–64 have a characteristically high resistance across the lead-in wires prior to ignition, and upon flashing provide a reliable short circuit across the inleads. Normally-closed disconnect switches in accordance with the invention are respectively connected in series with the first three lamps. More specifically a disconnect switch 67 is connected in series with lamp 61; switch 68 is connected in series with lamp 62; and switch 69 is series connected with lamp 63. In this arrangement, the disconnect switches control the sequencing from one lamp to the next, without the need for the connect switches employed in the circuit arrangement of FIG. 8. More specifically, the circuit of FIG. 11 operates as follows. Prior to the application of voltage pulses, switch 67 effectively shorts out all but the first lamp 61. Accordingly, the first input pulse ignites lamp 61 and the radiation therefrom activates disconnect switch 67 to rapidly provide an open circuit. Subsequent to ignition, lamp 61 forms a short circuit. Accordingly, the second input pulse will be applied across lamp 62 via the shorted lamp 61 and the normally closed disconnect switch 68. Ignition of lamp 62 forms a near zero or low resistance circuit through the lamp and activates switch 68 to provide an open circuit. Hence, the third input pulse ignites lamp 63, which in turn forms a short and activates switch 69 to provide an open circuit. And finally the fourth input pulse ignites the remaining lamp 64 which is directly connected across terminals 65 and 66 via the respectively shorted lamps 61, 62 and 63.

Accordingly, although the invention has been described with respect to specific embodiments, it will be appreciated that modifications and changes may be made by those skilled in the art without departing from the true spirit and scope of the invention.

What we claim is:

1. In a multilamp photoflash unit containing a plurality of flashlamps and circuit means for sequentially igniting said flashlamps, at least one radiant-energy-activated quick-disconnect switch included in said circuit means, said disconnect switch being electrically connected in series with one of said flashlamps for interrupting the ignition circuit means for said flashlamp after said flashlamp is ignited, said disconnect switch comprising a length of electrically conductive, heat shrinkable material positioned so as to be in operative relationship with the radiant output from said ignited flashlamp, said heat shrinkable material being attached to said circuit means at both ends of said length thereof, with the mid portion of said length of heat shrinkable material being spatially suspended to avoid substantial thermal contact with heat absorbing surfaces and thereby maximize the speed with which the shrinking and separation of said mid portion occurs upon its being heated by the radiant output of said ignited flashlamp.

2. The unit of claim 1 wherein said heat shrinkable material comprises a polymeric material which is rendered electrically conductive by an additive of conductive material in the composition thereof.

3. The unit of claim 1 wherein said length of heat shrinkable material is self-adhesive on at least portions of one side thereof to facilitate attachment of said circuit means.

4. The unit of claim 1 wherein said heat shrinkable material comprises mono- or biaxially oriented polyethylene, polypropylene, polystyrene, polyester or nylon.

5. The unit of claim 1 wherein said circuit means includes a printed circuit board having a pattern of conductive traces thereon, said length of heat shrinkable material is attached to said circuit board solely at said ends thereof, and portions of said conductive traces are carried over the attached ends of said length of heat shrinkable material.

6. The unit of claim 5 wherein said printed circuit board has an aperture therethrough in alignment with the flashlamp connected in series with said disconnect switch, and the midportion of said length of heat shrinkable material is spatially suspended by bridging said aperture.

7. The unit of claim 6 further including a reflector positioned between said flashlamp and one side of said circuit board and having an aperture in alignment with the aperture in said circuit board, and a radiant-energy-activated flash indicator disposed on the opposite side of said circuit board in alignment with the aperture therein, whereby ignition of said flashlamp is operative via the resulting radiation through said apertures to activate both said quick-disconnect switch and said flash indicator.

8. The unit of claim 6 further including a reflector positioned between said flashlamp and one side of said circuit board and having an aperture in alignment with the aperture in said circuit board, and wherein said heat shrinkable material is in the form of a patch covering the aperture in said circuit board and having an indicator color on the side of said patch facing said circuit board aperture, whereby upon ignition of said flashlamp the resulting shrinking and separation of the portion of said patch covering said aperture provides the dual functions of both disconnect switch and flash indicator.

9. The unit of claim 1 wherein said heat shrinkable material comprises a polymeric material which is rendered electrically conductive by a deposit of conductive material on at least a portion of the surface of said length of polymeric material.

10. The unit of claim 9 wherein said length of conductive polymeric material is locally blackened on at least a portion of the surface thereof facing said flashlamp.

11. The unit of claim 9 wherein said polymeric material is mono- or biaxially oriented.

12. The unit of claim 11 wherein said polymeric material is polyethylene, polypropylene, polystyrene, polyester or nylon.

13. The unit of claim 12 wherein said length of polymeric material is aluminized to render its surface conductive.

14. A photoflash lamp array comprising a printed circuit board having circuitry on a surface thereof, a plurality of flashlamps positioned over said surface and having lead-in wires connected to said circuitry, said circuitry being provided for sequentially igniting said flashlamps, a plurality of reflectors respectively associated with said flashlamps and positioned between said lamps and said circuit board, at least a subplurality of said reflectors each having a first aperture therein, and a respective subplurality of radiant-energy-activated quick-disconnect switches attached to said circuit board in alignment respectively with the first apertures of said reflectors, each of said disconnect switches being electrically connected to said circuitry in series with a respective one of said flashlamps for interrupting the ignition circuit for said flashlamp after said flashlamp is ignited, each of said disconnect switches comprising an electrically conducting strip of polymeric material having a melting point between about 80° and 250° C, said strip being attached at both ends to said circuit board with the midportion of said strip being spatially suspended to avoid contact with said circuit board, and each of said strip midportions being positioned so as to be in operative relationship with the radiant output from a respective ignited flashlamp via the first aperture in a respective reflector.

15. The array of claim 14 wherein said circuit board has at least a respective subplurality of apertures in alignment respectively with the first apertures of said reflectors, each of said circuit board apertures is covered with a patch of said polymeric material having an indicator color on the side of the patch facing the circuit board aperture, and each of said electrically conducting strips is provided by a deposit of conductive material on a surface of a respective one of said polymeric patches in the form of a strip bridging the circuit board aperture covered by the patch, each of said conductive strip portions of polymeric material thereby being spatially suspended from said circuit board at the midportion thereof, whereby upon ignition of one of said flashlamps the resulting activation of the aperture-covering portion of the polymeric patch associated with said ignited lamp provides the dual functions of both disconnect switch and flash indicator.

16. The array of claim 14 wherein said circuit board has at least a respective subplurality of apertures in alignment respectively with the first apertures of said reflectors, and the midportion of each of said strips of polymeric material is spatially suspended by bridging a respective one of the apertures in said circuit board, and further including at least a respective subplurality of radiant-energy-activated flash indicators disposed on the opposite side of said circuit board from said lamps and reflectors in alignment respectively with the apertures in said circuit board, whereby ignition of one of said flashlamps is operative via the resulting radiation through its respective reflector and circuit board apertures to activate both the disconnect switch and flash indicator aligned therewith.

17. The array of claim 16 wherein at least each of said subplurality of reflectors has a second aperture therein, and further including a respective subplurality of radiant-energy-activated connect switches disposed on said circuit board in alignment respectively with the second apertures in said reflectors and connected to said circuitry, each of said connect switches being electrically connected in series with a respective one of said flashlamps for establishing the igniting circuit for said flashlamp after ignition of the preceding flashlamp in the igniting sequence, whereby ignition of said preceding flashlamp is operative via the resulting radiation through its respective reflector and circuit board apertures to activate the disconnect switch and flash indicator aligned with the first aperture of the reflector and the connect switch aligned with the second aperture of the reflector.

18. The array of claim 16 wherein both said disconnect switch strips and said flash indicators comprise heat shrinkable polymeric material.

19. The array of claim 14 wherein said flashlamps are of the high voltage type adapted by means of said circuitry to be ignited sequentially by successively applied high voltage firing pulses, said flashlamps are parallel connected with each other, and each of said disconnect switches is operative upon ignition of the flashlamp associated therewith and in response to the resulting radiation therefrom to reliably provide an open circuit to high voltages within about 30 milliseconds or less, said open circuit being capable of withstanding at least 4000 volts without leakage.

20. The array of claim 19 wherein each of said disconnect switch strips comprises a heat shrinkable polymeric material, each of said strips is self-adhesive on the side thereof attached to said printed circuit board, the circuitry on said circuit board comprises a pattern of conductive traces thereon, and portions of said conductive traces are carried over the attached ends of each of said electrically conducting strips comprising a disconnect switch.

21. The array of claim 20 wherein said polymeric material comprising each of said disconnect switch strips is rendered electrically conducting by a deposit of conductive material on at least a portion of the surface of each of said strips.

22. A photoflash unit comprising a printed circuit board having lamp igniting circuitry on a surface thereof, at least one flashlamp connected to said circuitry, and a radiant-energy-activated quick-disconnect switch connected to said circuitry in series with said lamp and positioned in alignment with said lamp, said switch comprising an electrically conducting strip of heat shrinkable material attached at both ends to said circuit board, with the midportion of said strip being spatially suspended to avoid contact with said circuit board and thereby maximize the speed with which the shrinking and separation of said midportion occurs upon its being heated by the radiant output of said flashlamps when said lamp is ignited.

23. The unit of claim 22 wherein said heat shrinkable material comprises a polymeric material, said printed circuit board has an aperture therethrough in alignment with said flashlamp, and the midportion of said strip of heat shrinkable polymeric material is spatially suspended by bridging said aperture, whereby upon ignition of said flashlamp said switch is operative in response to the radiation from said lamp to rapidly provide a reliable open circuit to high voltages.

24. The unit of claim 22 wherein said printed circuit board has an aperture therethrough in alignment with said flashlamp, said heat shrinkable material comprises a piece of polymeric materials in the form of a patch covering said aperture and having an indicator color on the side facing said aperture, and said electrically conducting strip is provided by a deposit of conductive material on a surface of said polymeric patch in the form of a strip bridging said aperture, said conductive strip portion of said polymeric material thereby being spatially suspended from said board at the midportion thereof, whereby upon ignition of said flashlamp the resulting shrinking and separation of the portion of said patch covering said aperture provides the dual functions of both disconnect switch and flash indicator.

* * * * *